United States Patent
Clark (10) Patent No.: US 10,722,951 B1
(45) Date of Patent: Jul. 28, 2020

(54) ADJUSTABLE HOLDING DEVICE

(71) Applicant: KREG ENTERPRISES, INC., Huxley, IA (US)

(72) Inventor: Scott L. Clark, Boone, IA (US)

(73) Assignee: KREG ENTERPRISES, INC., Huxley, IA (US)

( * ) Notice: Subject to any disclaimer, the term of this patent is extended or adjusted under 35 U.S.C. 154(b) by 0 days.

(21) Appl. No.: 16/216,697

(22) Filed: Dec. 11, 2018

Related U.S. Application Data (63) Continuation of application No. 15/816,104, filed on Nov. 17, 2017.

(60) Provisional application No. 62/423,970, filed on Nov. 18, 2016.

(51) Int. Cl.
*B23B 47/28* (2006.01)
*B23Q 3/06* (2006.01)

(52) U.S. Cl.
CPC ............ *B23B 47/28* (2013.01); *B23B 47/287* (2013.01); *B23Q 3/06* (2013.01); *B23B 47/288* (2013.01); *B23B 2247/10* (2013.01)

(58) Field of Classification Search
CPC ... B23B 47/28; B23B 47/287; B23B 2247/10; B23B 47/288; B23B 2260/0485; B23B 2260/0487; B23B 49/006; B23Q 3/06
See application file for complete search history.

(56) References Cited

U.S. PATENT DOCUMENTS

| | | |
|---|---|---|
| 5,322,396 A | 6/1994 | Blacker |
| 5,382,120 A * | 1/1995 | Parsons .................. B23B 49/00 33/201 |
| 5,676,500 A | 10/1997 | Sommerfeld |
| 5,791,835 A | 8/1998 | Chiang et al. |
| 5,890,897 A * | 4/1999 | Kruger .................. A61C 1/082 408/202 |
| 6,254,320 B1 | 7/2001 | Weinstein et al. |
| 6,394,712 B1 | 5/2002 | Weinstein et al. |
| 6,599,064 B1 | 7/2003 | Robinson |
| 6,726,411 B2 | 4/2004 | Sommerfeld et al. |
| D503,415 S | 3/2005 | Dembicks |
| 6,955,508 B1 | 10/2005 | Radcliffe |
| D528,930 S | 9/2006 | Degen |
| 7,101,123 B1 | 9/2006 | Weinstein et al. |
| 7,134,814 B1 | 11/2006 | Park |
| D567,269 S | 4/2008 | Sion |
| 7,374,373 B1 | 5/2008 | Park et al. |
| 7,484,914 B1 | 2/2009 | Weinstein et al. |
| 7,597,513 B2 | 10/2009 | Chiang |

(Continued)

FOREIGN PATENT DOCUMENTS

AU 8345001 A 3/2002
AU 2014295887 A1 2/2016
(Continued)

*Primary Examiner* — Sunil K Singh
*Assistant Examiner* — Paul M Janeski
(74) *Attorney, Agent, or Firm* — Christopher A. Proskey; BrownWinick Law Firm (57) ABSTRACT

An adjustable holding device having a pair of adjustment drill grooves and a transverse exhaust channel. Attached to the base is a vertical support member having guide supports. At least one of the guide supports is horizontally adjustable. Drill guides are removably attached to the guide support for both vertical and horizontal adjustment.

54 Claims, 8 Drawing Sheets

(56) References Cited

U.S. PATENT DOCUMENTS

| | | | |
|---|---|---|---|
| 7,641,425 B2 * | 1/2010 | Sommerfeld | B23B 47/287 269/224 |
| 7,670,089 B2 | 3/2010 | Chiang | |
| 7,798,750 B2 | 9/2010 | Clark | |
| 8,052,358 B2 | 11/2011 | McDaniel et al. | |
| 8,083,443 B1 | 12/2011 | Circosta et al. | |
| D651,885 S | 1/2012 | Banasik | |
| 8,087,853 B2 | 1/2012 | Stukuls | |
| 8,231,313 B2 | 7/2012 | Sommerfeld et al. | |
| 8,840,345 B1 | 9/2014 | Park | |
| 9,682,430 B2 | 6/2017 | Clark | |
| 9,782,837 B2 | 10/2017 | Pelkey | |
| D809,032 S | 1/2018 | Cummings | |
| D809,578 S | 2/2018 | Cummings | |
| 9,969,011 B1 | 5/2018 | Marusiak | |
| 9,969,042 B2 | 5/2018 | Clark | |
| 10,022,808 B2 | 7/2018 | Chang | |
| 10,144,068 B2 | 12/2018 | Poole | |
| 10,173,269 B2 | 1/2019 | Cattaneo | |
| 10,286,458 B2 | 5/2019 | Brigham | |
| 10,315,295 B2 | 6/2019 | Vandenberg | |
| 10,343,222 B2 | 7/2019 | Schwagerle et al. | |
| 10,357,831 B2 | 7/2019 | Evatt et al. | |
| 10,376,967 B2 | 8/2019 | Poole et al. | |
| 2003/0123941 A1 | 7/2003 | Emerson | |
| 2004/0253065 A1 | 12/2004 | Davis | |
| 2005/0089381 A1 | 4/2005 | Liu | |
| 2006/0228180 A1 | 10/2006 | Sommerfeld | |
| 2007/0201961 A1 | 8/2007 | Chiang | |
| 2007/0280797 A1 | 12/2007 | McDaniel et al. | |
| 2008/0075546 A1 | 3/2008 | Lin | |
| 2008/0099101 A1 | 5/2008 | Chiang | |
| 2008/0187404 A1 | 8/2008 | Chiang | |
| 2011/0150587 A1 | 6/2011 | Stukuls | |
| 2012/0051865 A1 | 3/2012 | Liu | |
| 2016/0158850 A1 | 6/2016 | Fisher | |
| 2017/0087644 A1 | 3/2017 | Pelkey | |
| 2018/0071835 A1 | 3/2018 | Poole et al. | |
| 2018/0141133 A1 | 5/2018 | Clark | |
| 2018/0185930 A1 | 7/2018 | Duginske | |
| 2018/0214959 A1 | 8/2018 | Evatt et al. | |
| 2018/0214960 A1 | 8/2018 | Evatt et al. | |
| 2018/0290217 A1 | 10/2018 | Asimakis | |
| 2018/0345385 A1 | 12/2018 | Yates et al. | |
| 2019/0015903 A1 | 1/2019 | Schleicher | |
| 2019/0030619 A1 | 1/2019 | Thackery | |
| 2019/0047058 A1 | 2/2019 | Pikarski et al. | |
| 2019/0054547 A1 | 2/2019 | Pikarski et al. | |
| 2019/0111499 A1 | 4/2019 | Evatt et al. | |
| 2019/0126360 A1 | 5/2019 | Marra, Jr. | |
| 2019/0176247 A1 | 6/2019 | Chang | |
| 2019/0217402 A1 | 7/2019 | Bringham | |

FOREIGN PATENT DOCUMENTS

| | | |
|---|---|---|
| AU | 2018101034 A4 | 8/2018 |
| CA | 3012668 | 1/2019 |
| DE | 102004023343 A1 | 12/2005 |
| DE | 202006005977 U1 | 8/2006 |
| DE | 60125047 T2 | 7/2007 |
| DE | 202012103274 U1 | 9/2012 |
| DE | 202017101885 U1 | 5/2017 |
| DE | 202018104374 U1 | 9/2018 |
| DE | 102004023343 | 1/2019 |
| DE | 102017115668 | 1/2019 |
| EP | 1712315 A1 | 10/2006 |
| EP | 1311364 B1 | 12/2006 |
| EP | 1595627 B1 | 4/2008 |
| EP | 2512763 A2 | 10/2012 |
| EP | 2223762 B1 | 7/2015 |
| EP | 3027364 A1 | 6/2016 |
| EP | 3391984 A1 | 10/2018 |
| EP | 3444057 | 2/2019 |
| EP | 3444058 | 2/2019 |
| EP | 3446817 | 2/2019 |
| GB | 2346573 | 8/2000 |
| GB | 2496473 A | 5/2013 |
| GB | 201806455 | 10/2018 |
| GB | 2564944 | 1/2019 |
| GB | 2567053 | 4/2019 |
| GB | 2567056 | 4/2019 |

\* cited by examiner

ADJUSTABLE HOLDING DEVICE

CROSS REFERENCE TO RELATED APPLICATION

This application is a continuation of U.S. Utility application Ser. No. 15/816,104 which was filed on Nov. 17, 2017, which claims the benefit to Provisional Application U.S. Ser. No. 62/423,970 filed on Nov. 18, 2016, the entirety of which is incorporated herein fully by reference.

BACKGROUND OF THE INVENTION

This invention is directed to an adjustable holding device and more particularly to a holding device for drilling holes in an object.

Drill guides and pocket hole jigs are well-known in the art for use in drilling holes for pocket hole joinery. An important feature of these devices is the ability to accommodate work pieces of varying size. While devices are known that are adjustable, these devices are adjustable in a single direction and do not permit set-up of drilling guides at different widths and heights. In addition, chip or shaving extraction is set-up at the rear of the guides and as a result wood chips are discharged onto the floor creating a mess. Also while devices exist for setting the depth of a drill bit, the devices are complicated and difficult to use. Therefore, a need exists in the art for a device that addresses these deficiencies.

An objective of the present invention is to provide an adjustable holding device where the height and width of drill guides are selectively adjusted.

Another objective of the present invention is to provide an adjustable holding device where shaving and chip extraction is not discharged onto the floor.

A still further objective of the present invention is to provide an adjustable holding device where setting drill depth is simple and easy.

These and other objectives will be apparent to one skilled in the art based upon the following written description, drawings and claims.

SUMMARY OF THE INVENTION

An adjustable holding device having a base, a vertical support member, and a clamping assembly. The base has a top and side walls. A pair of drill adjustment grooves extend downwardly along the side walls at the outer edges of the top of the base. The grooves have a cut-out portion that slidable receives an adjustment member.

Extending transversely across the base is an exhaust channel. The exhaust channel has a bottom wall, a first side wall, a second side wall, and a pair of exhaust ports that extend through the side walls of the base.

Connected to, or integral with, an end of the base is a vertical support member. The vertical support member has a pair of guide supports. At least one of the guide supports is slidably connected to a vertical support wall to permit adjustment of both the height and width of drill guides in multiple directions.

Alternatively, drill guide members are adjustably mounted to a guide support bracket. The bracket has a top wall and a pair of side walls. At one end of the bracket, extending down a side wall is a vertical groove. Moveably received within the groove is a slider.

DETAILED DESCRIPTION OF THE PREFERRED EMBODIMENT

Figure 1:
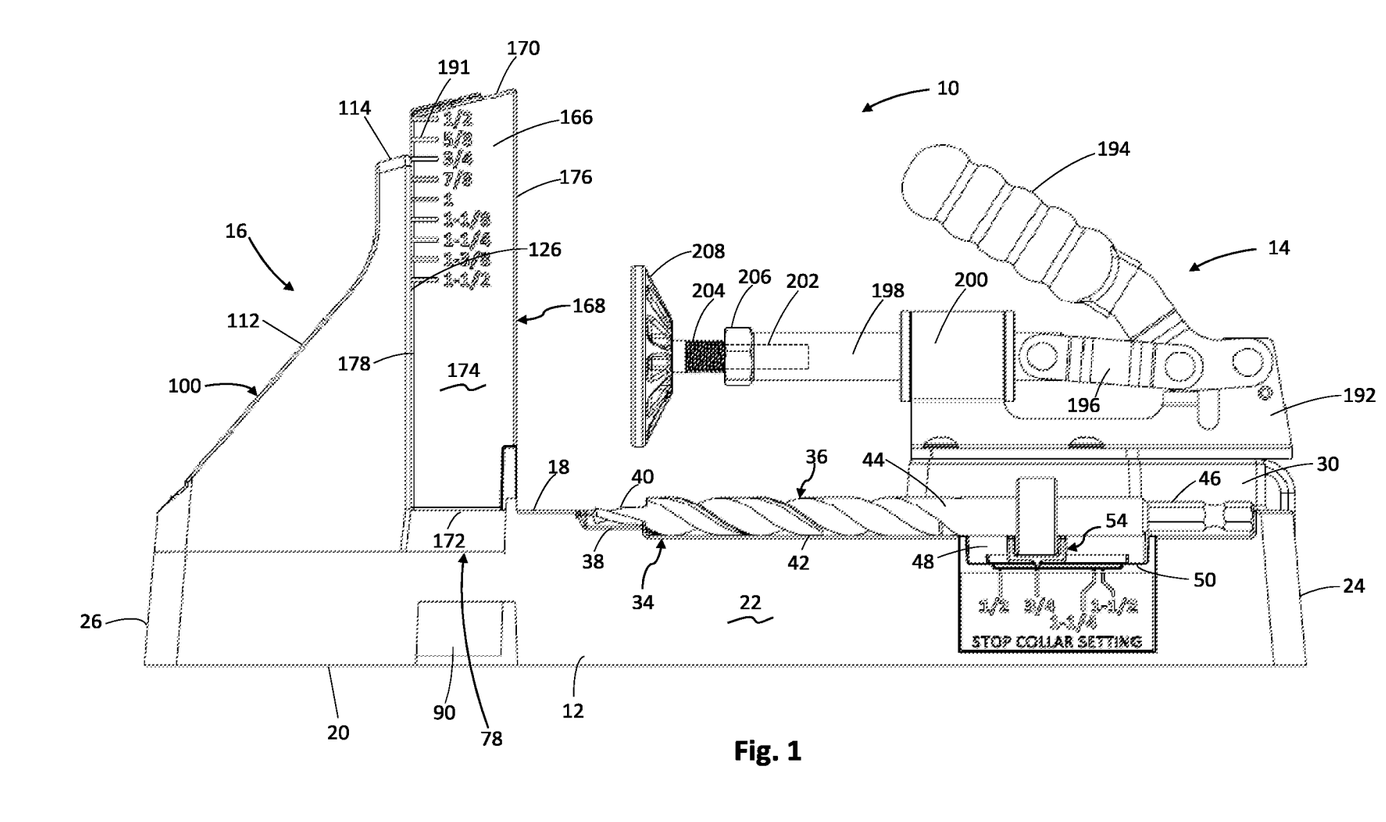
FIG. 1 is a side view of an adjustable holding member.
Figure 2:
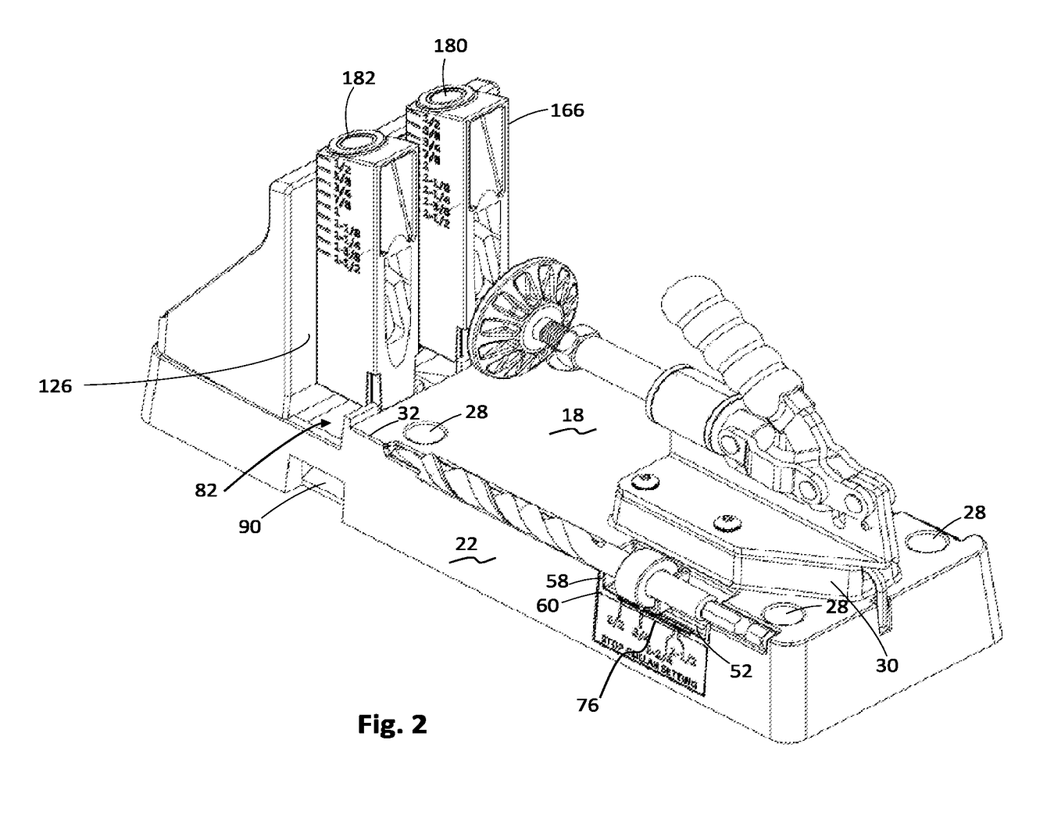
FIG. 2 is a perspective view of an adjustable holding member.
Figure 3:
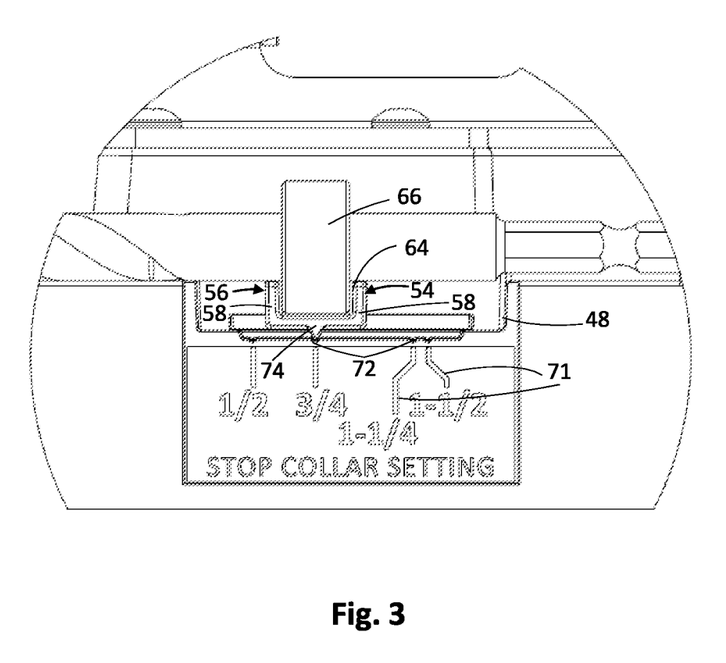
FIG. 3 is an enlarged section of a side view of an adjustable holding device.
Figure 4:
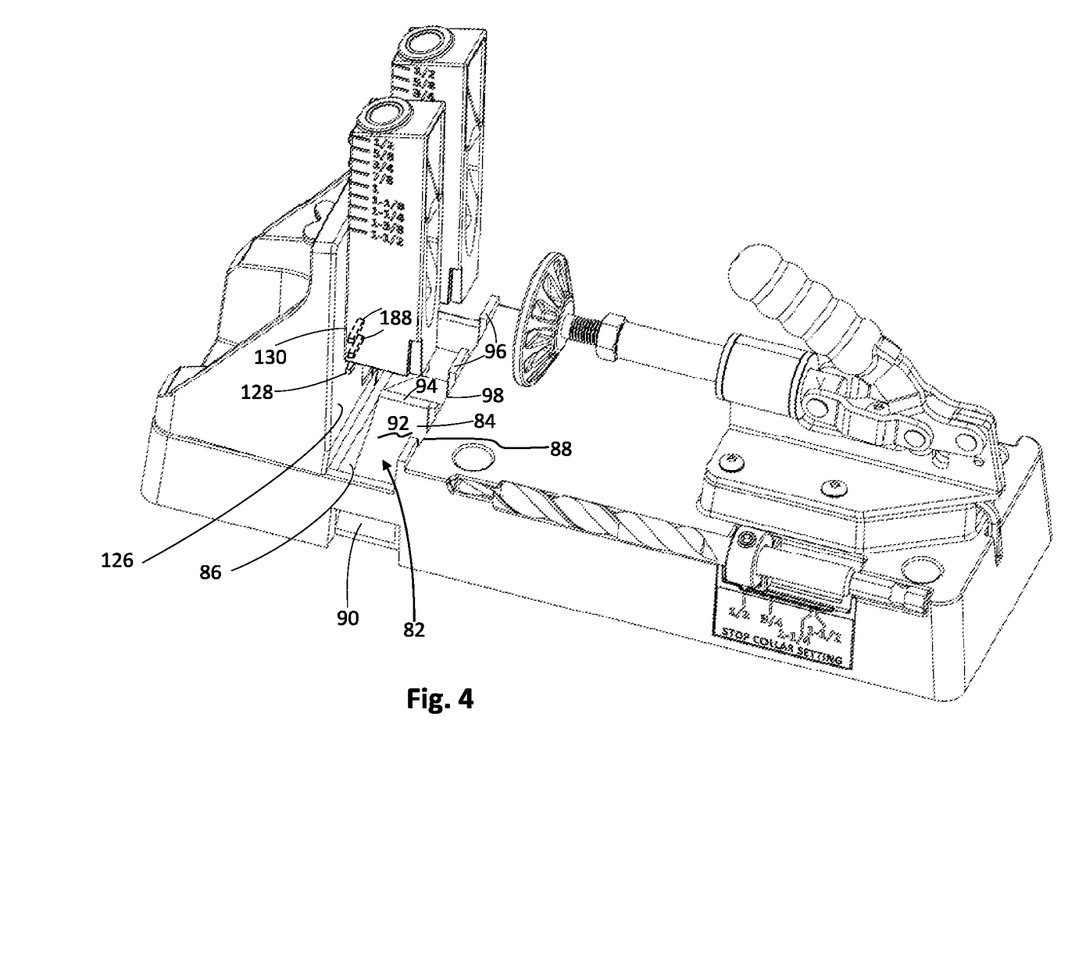
FIG. 4 is a perspective view of an adjustable holding member.
Figure 5:
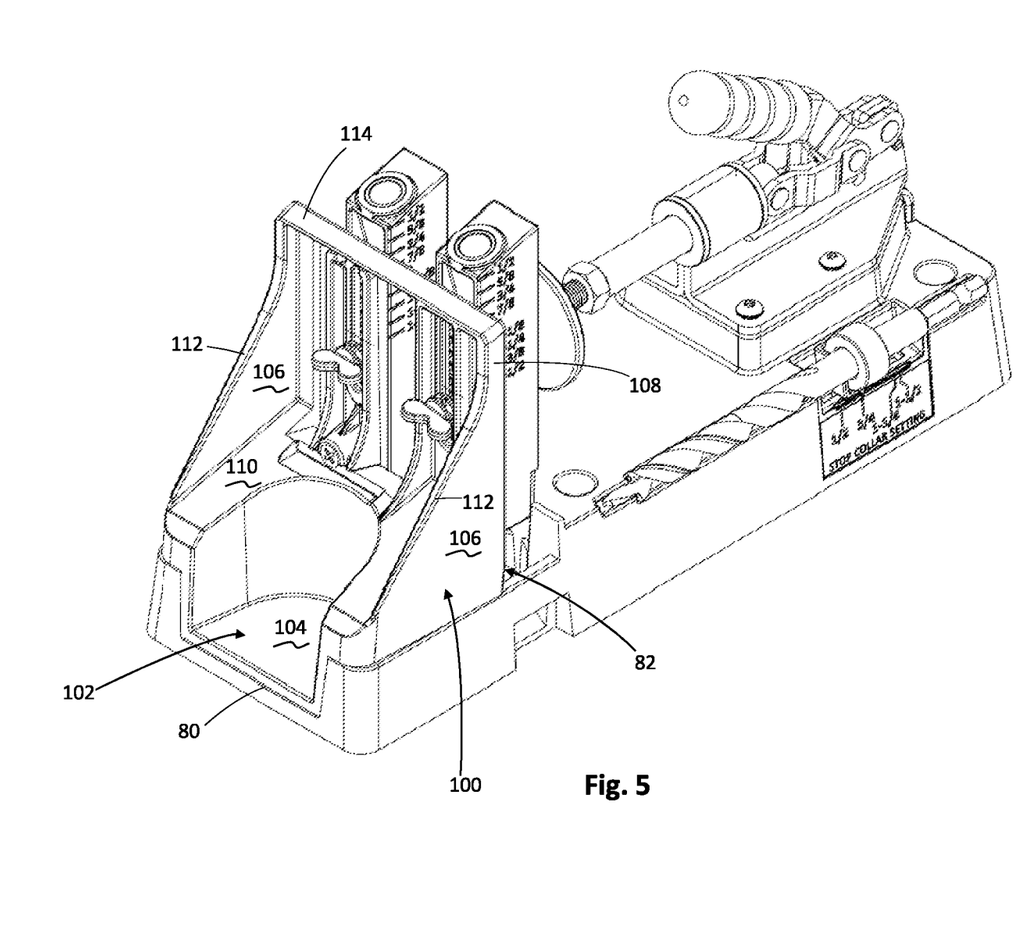
FIG. 5 is a perspective view of an adjustable holding member.
Figure 6:
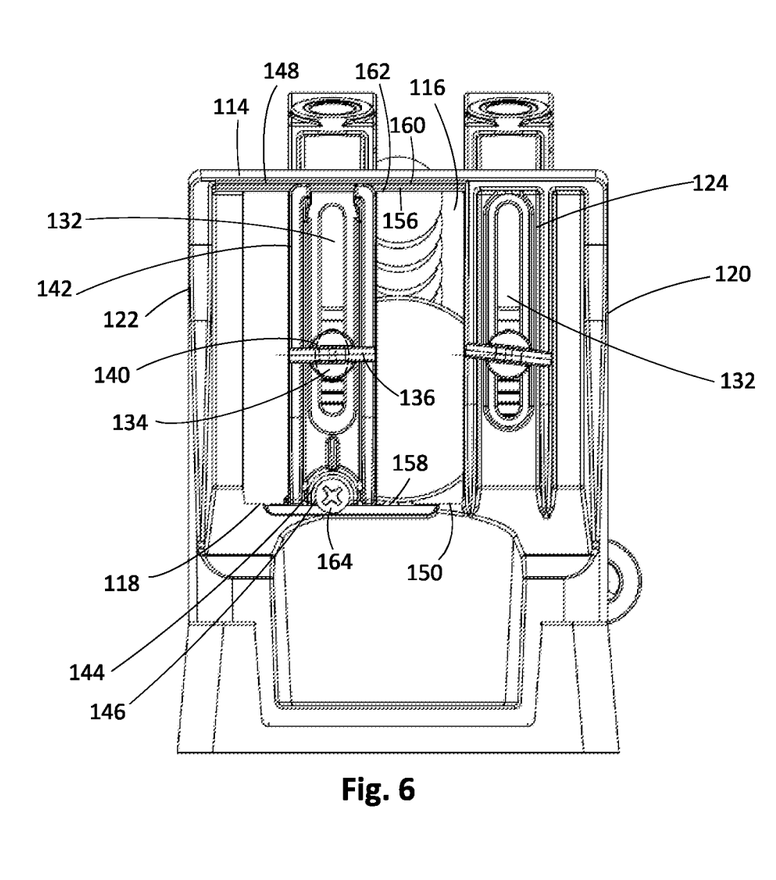
FIG. 6 is an end view of an adjustable holding device.
Figure 7:
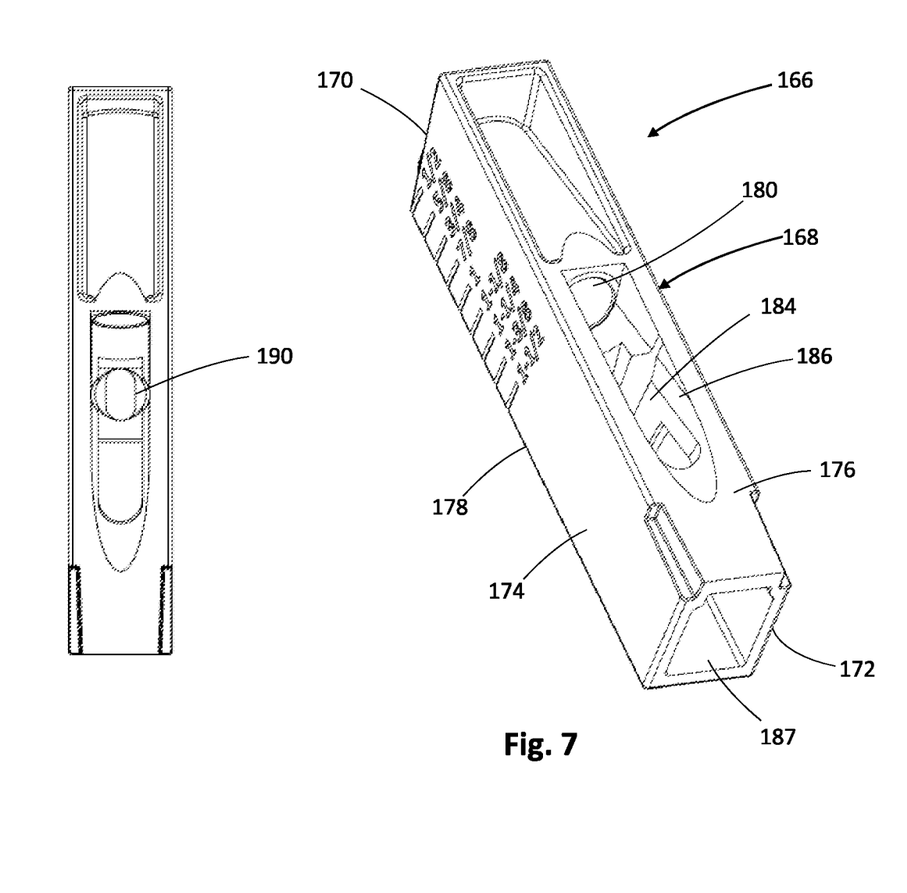
FIG. 7 is an end view and perspective view of a drill guide member.
Figure 8:
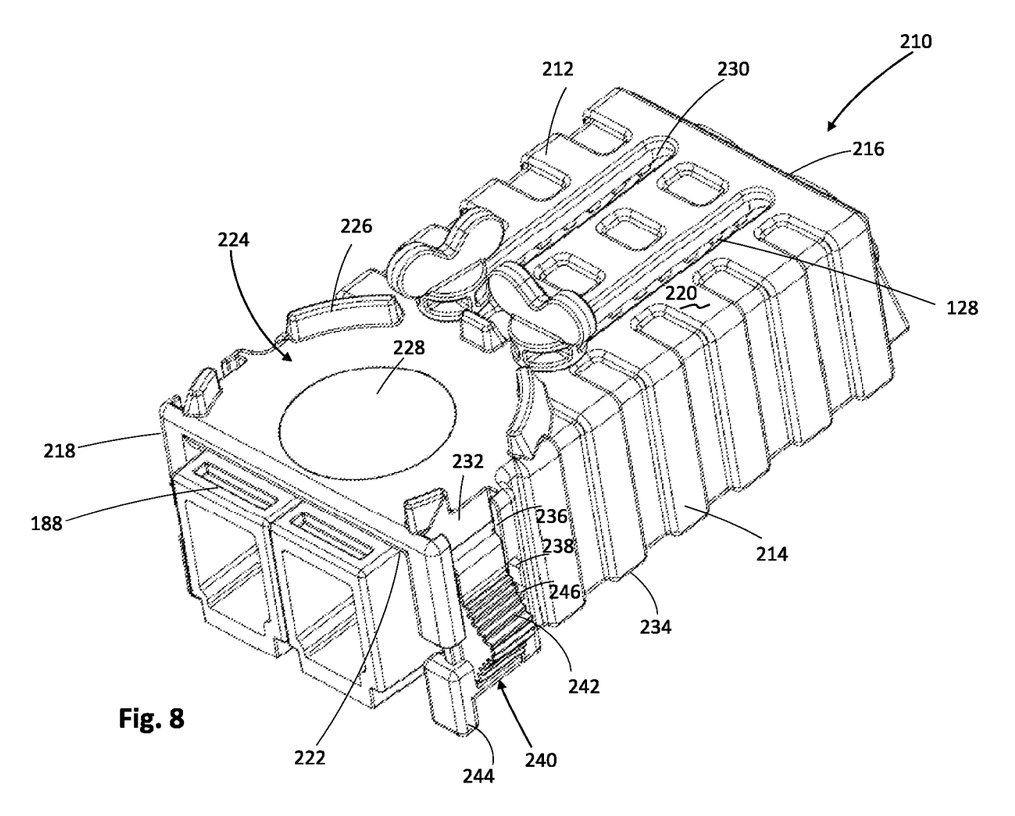
FIG. 8 is a perspective view of an adjustable holding member.

Referring to the Figures, an adjustable holding device 10 has a base 12, a clamp assembly 14, and a guide assembly 16. The base 12 is of any size, shape, and structure. In one example, the base 12 is generally rectangular in shape having a top 18, a bottom 20, side walls 22, a first end 24 and a second end 26. Extending through the base 12, from the top 18 to the bottom 20 are a plurality of connecting bores 28 that receive screws to attach the device 10 to a work surface.

Extending upwardly from the top 18 of the base 12 adjacent the first end 24 is a platform 30 to which the clamping assembly 14 is attached. At the outer edges 32 of the top 18, and extending down the sides 22, are a pair of drill adjustment grooves 34. The grooves 34 are formed to receive a drill bit 36. The groove 34 preferably has a reduced section 38 to receive the tip 40 of the drill bit 36 with a larger elongated section 42 that receives the body 44 and the head 46 of the drill bit 36. Between the tip 40 and the head 46, the groove 34 has a cut-out portion 48 that extends inwardly and downwardly to form a shelf 50. Extending through the shelf 50 is an elongated slot 52. Slidably attached to the slot 52 is an adjustment member 54. The adjustment member 54 is of any size and shape and in one example has a first section 56 that includes a pair of sidewalls 58 and a bottom wall 60 that extend outwardly from a back wall 62 to form a receiving chamber or slot 64. The receiving chamber 64 is formed to receive an adjustable depth collar 66 of the drill bit 36. Extending from the bottom wall 62 of first section 56 and through slot 52 of shelf 50 is a neck 68 that is slidably received within slot 52. Neck 68 terminates in a retaining head 70 having a width greater than the width of the slot 52 to retain the adjustment member 54 within slot 52.

In a preferred embodiment the sidewall 22 of the base 12 have distance markings 71 that align with notches 72 in the side walls 22 that extend downwardly from the shelf 50. A projection 74 extends downwardly from an outer edge 76 of the bottom wall 60 of the adjustment member 54 that is positioned to be selectively received within notches 72. Preferably, the grooves 34 and/or the cut-out portion 48 are off-set to permit different depth adjustment distances for the adjustable depth collar 66. For example, one side the cut-out portion 48 is further away from the first end 24 and has distance markings 71 representing a drill bit 36 depth of ½, ¾, 1¼, and 1½ inches. On the opposite side of the base 12 the cut-out portion 48 is closer to the first end 24 and has distance markings 71 of ⅝, ⅞, 1, 1⅛, and 1⅜ inches.

The second end 26 of the base 12 preferably has a cut-down section 78 that includes a clamp cut-out portion 80 that is formed to receive a clamping portion of a table clamp (not shown) or the like. Adjacent the clamp cut-out portion 80 is an exhaust channel 82 that extends transversely across the base 12 between the side walls 22. Preferably, the channel 82 has a bottom wall 84 between a first wall 86, a second wall 88, and a pair of exhaust ports 90 in side walls 22 that are in communication with channel 82. The bottom wall 84 has a pair of sections 92 that angle downwardly from an apex 94 to the exhaust ports 90. Preferably the apex 94 is generally centered between sidewalls 22. Second wall 88 has a plurality of outwardly extending projections 96 that form at least three slots 98.

Connected to the second end 26 of the base 12 is a vertical support member 100. Alternatively, the vertical support member 100 is integral with the base 12. The vertical support member 100 is of any size, shape and structure. In a preferred example the vertical member 100 is formed to nest within the clamp cut-out portion 80 and rest on the cut-down section 78 adjacent the exhaust channel 82. The vertical support member 100 has a clamp cut-out portion 102 that nests within the clamp cut-out portion 80 of the base 12, a bottom wall 104, side walls 106, and a vertical support wall 108. The clamp cut-out portion 102 extends above the bottom wall 104 and terminates in a shelf 110. The bottom wall 104 rests upon the top 18 of the cut-down section 78 of the base 12. The side walls 106 extend vertically and dwell in the same vertical plane as the side walls 22 of the base 12. Both side walls 106 have a top edge 112 that angles upwardly from the shelf 110 at the second end 26 toward a top edge 114 of the vertical support wall 108.

The vertical support wall 108 extends vertically from the bottom 104 to the top edge 114 and dwells generally in the same vertical plane as the first wall 86 of the exhaust channel 82. The vertical support wall 108 has an opening 116 between the top edge 114, a first side edge 120, a second side edge 122, and a bottom edge 118. Extending inwardly from the first side edge 120 is a first guide support 124. The first guide support 124 has a clamping face 126 that faces the clamp assembly 14. Vertically aligned in parallel spaced relation are a plurality of horizontal projections 128 that extend outwardly from the clamping face 126 to form a vertical track 130. Extending through at least a portion of the vertical track 130 of the vertical support wall 108 is a vertical slot 132. Slidably received within the vertical slot 132 is a retaining member 134. The retaining member 134 is of any size, shape, structure, and type and in a preferred example has a head 136 similar to a wing nut that is wider than slot 132, a neck 138 that is more narrow than slot 132, and a catch 140. The catch 140 is elongated such that in a first position the catch 140 will fit through slot 132 and in a second position the catch 140 is too wide to fit through slot 132.

Slidably connected within the opening 116 of the vertical support wall 108 is a second guide support 142. Like the first guide support 124, the second guide support 142 has a vertical track 130, a vertical slot 132, and a retaining member 134. The second guide support 142 also has an opening 144 below the track 130 that is either threaded or formed to receive a nut 146. On the top 148 and the bottom 150 of the second guide support are grooves 152 and 154 that are formed to receive a top rail 156 and a bottom rail 158. The top rail 156 extends downwardly from a top edge 160 of opening 116 and the bottom rail 158 extends upwardly from a bottom edge 162 of opening 116. Preferably, the bottom rail 158 is angled downwardly toward exhaust channel 82. The second guide support 142 is moveable within opening 116 toward and away from second side edge 122. To lock the position of the second guide support 142 a screw 164 is inserted into thread opening or nut 144 and tightened. Once tightened a force between a head of the screw 164 and the second guide member 142 is created against the bottom rail 158 sufficient to prevent the second guide member 142 to move laterally.

Adjustably connected to the first guide support 124 and the second guide support 142 are guide members 166. Each guide member 166 has an elongated body 168 having a top 170, a bottom 172, sides 174, a front 176, and a back 178. The top 170 is angled upwardly from the back 178 to the front 176. Extending from the top 170 to the front 176 at an angle is an elongated drilling bore 180. Received within the bore 180 is a drill insert 182 that preferably is made of metal. The bore 180 terminates at a hollow chamber 184 within body 168. The chamber 184 has an opening 186 on the front 176 that permits the drill bit 36 to be inserted through both bore 180 and opening 186 to engage and drill a hole within an object such as a piece of wood or the like. The chamber 184 also has an opening 187 that extends through bottom 172. The back 178 has a plurality of horizontal slots 188 in spaced parallel relation that are positioned to selectively align with and receive the projections 128 of track 130. Extending through the back 178 and a portion of the horizontal slots 188 to the chamber 184 is a retaining slot 190. Retaining slot 190 is positioned to align with slot 132 and selectively receive the catch 140 of retaining member 134. At least one side 174 has distance markings 191 that are vertically spaced and extend downwardly from top 170.

Clamp assembly 14 is of any size, shape, type and structure. In the example shown, the clamp assembly 14 has a mounting bracket 192 connected to platform 30 of base 12. Pivotally connected to the mounting bracket 192 is a handle 194. A pair of link arms 196 are pivotally connected to handle 194 at a first end to a clamping shaft 198 at the opposite end. The clamping shaft 198 extends through a guide tube 200 that is part of the mounting bracket 192. The clamping shaft 198 also has a threaded bore 202 that receives a threaded screw 204. An adjustment nut 206 is threadably received on the threaded screw 204 and a clamp bumper 208 is attached to the end of the screw 204.

In operation, to set the depth collar 66 on the drill bit 36, the depth collar 66 is placed on the body 44 of the drill bit 36 and is received within the receiving chamber 64 of the adjustment member 54 when the drill bit 36 is placed within one of the drill adjustment grooves 34. The adjustment member 54 is then moved laterally within slot 52 to a desired distance marking 71 where the projection 74 of the adjustment member 54 is received in a notch 72. When the adjustment member 54 is moved the depth collar 66 is also moved to the desired distance marking 71 and the depth collar 66 is locked in place with a set screw as is known in the art.

Next, the guide members 166 are positioned at a desired width and height. To set the desired width, the second guide support 142 is moved laterally along top rail 156 and bottom rail 158 to either a first or a second position. In the first position the second guide support 142 is closer to the first guide support 124 and is generally centered along the length of the base 12. In the second position, the second guide support 142 is closer to the second side edge 122. Once positioned, screw 164 is tightened within opening 144 or nut 146 to lock the second guide support 142 in the desired position.

Next, the height of guide members 166 are set in relation to the top edge 112 of the vertical support wall 108. To set the position of the guide member 166, the desired distance marking 191 on the side 174 of the guide member 166 is aligned with the top edge 112 of the vertical support wall 108. Once aligned, the back 178 of the guide member 166 is pressed against the clamping face 126 of the vertical support wall 108 such that the projections 128 of track 130 are received within the back horizontal slots 188 of the guide member 166. The catch 140 of retaining member 134 is then inserted through vertical slot 132 of guide supports 124 or 142 and the retaining slot 190 of guide member 166 and then turned to hold the guide member at the desired height. The guide members 166 may be set at different heights.

An object to be drilled, such as a piece of wood, is then placed on the top 18 of base 12 such that the object engages the front 176 of the guide members 166. The handle 194 of the clamp assembly 14 is then raised which cause clamp shaft 198 to move toward the object until clamp bumper 208 engages the object and clamps the object between the guide members 166 and the clamp bumper 208.

The drill bit 36, attached to a drill (not shown) is then inserted into drill bore 180 and by activating the drill a hole is drilled in the object. As the hole is drilled, shavings fall downward through the bottom opening 187 into exhaust channel 82. The shavings are directed toward the exhaust ports 90 by the angled bottom wall sections 92.

Alternatively, the guide members 166 are attached to a guide support bracket 210 that is clamped to a work surface horizontally over an object to be drilled. The guide support bracket 210 is of any size, shape, structure and type. In a preferred example, as shown, the guide support bracket 210 has a top wall 212, a pair of side walls 214, a first end 216, and a second end 218. The top wall 212 has a top surface 220 and a bottom surface 222. Adjacent the second end 218, on the top surface 220 of the top wall 212, is a clamp receiving section 224. The clamp receiving section 224 is formed to receive a clamping portion of a table clamp and is generally circular having projections 226 around an outer periphery of section 224 that extend upwardly from the top surface 220 of the top wall 212. In one example, a magnet 228 is centrally located within section 224 and extends through the top wall 212.

Extending from the clamp receiving section 224 toward the first end 216, and through the first end 216, and through the top wall 212, are a pair of parallel spaced elongated slots 230. The slots 230 receive retaining members 134 as previously described. On the bottom surface 222 of the top wall 212 are two sets of horizontal projections 128 that form a pair of tracks 130 along slots 230 as previously described.

Adjacent the second end 218 on an outer surface of the sidewalls 214 is a groove 232 that extends from the top wall 212 of bracket 210 to a bottom edge 234 of side walls 214. On an edge 236 of groove 232 is a cut-out 238. Moveably received within groove 232 is a slider 240 that is used to selectively capture the edge of an object such as a board. In the example shown, the slide 240 has a main body 242. At a lower end of main body 242 is a foot 244 that extends outwardly and downwardly from the main body 242. On the opposite side of the main body 242 is a stop 246 that extends outwardly from the main body 242 and is received within cut-out 238. The stop 246 prevents the slider 240 from moving out of groove 232. In a first or raised position the slider 240 is contained within groove 232 such the bottom edge 234 of the sidewalls 214 engage the object to be drilled. In a second or lowered position the foot 244 of the slider 240 capturing the end of the object to be drilled.

In operation, guide members 166 are attached to the bottom surface 222 of the top wall between the side walls 214 similarly to how previously described. The desired distance marking 187 is aligned with first end 216, back 178 is pressed against bottom surface 222 such that projections 128 of track 130 are received in slots 188, and retaining members 134 extend through slots 230 to connect guide members 166 to guide support bracket 210.

Once positioned the object to be drilled is placed on a work surface, the adjustable holding device 10 is placed on top of the object to be drilled, and table clamp is used to clamp the object between the holding device 10 and the work surface. Once clamped, the drill bits 36 are inserted through drill bores 108 and holes are drilled in the object.

What is claimed is:

1. A pocket hole drilling jig system, comprising:
a base;
an upright operatively connected to the base;
a clamp assembly operatively connected to the base;
a first guide member operatively connected to the base;
the first guide member having a first drill insert;
the first drill insert configured to receive and guide a drill bit having a body, a tip and an adjustable depth collar;
wherein the first drill insert extends through the first guide member at an angle such that when the drill bit is inserted in the first drill insert of the first guide member the drill bit exits a front side of the first guide member at an angle;
the base having a first drill adjustment groove that extends laterally with respect to the base;
the first drill adjustment groove having an elongated section, a reduced section and a cut out portion;
wherein the elongated section of the first drill adjustment groove is configured to receive the body of the drill bit;
wherein the reduced section of the first drill adjustment groove is configured to receive the tip of the drill bit;
wherein the cut out portion of the first drill adjustment groove is configured to receive the adjustable depth collar of the drill bit;
an adjustment member;
wherein the adjustment member is positioned within the cut out portion of the first drill adjustment groove;
wherein the adjustment member is configured to move laterally within the cut out portion and move relative to the base;
wherein when the drill bit is placed within the first drill adjustment groove such that the body of the drill bit is received within the elongated section of the first drill adjustment groove, the tip of the drill bit is received within the reduced section of the first drill adjustment groove, and the adjustable depth collar of the drill bit is received by the adjustment member, the adjustment member moves laterally thereby setting the position of the adjustable depth collar on the drill bit.

2. The system of claim 1, wherein the first drill adjustment groove is positioned in an upper surface of the base.

3. The system of claim 1, wherein the adjustment member slides laterally within the cut out portion of the first drill adjustment groove.

4. The system of claim 1, wherein the adjustment member includes a neck that is slidably received within a slot in the base thereby facilitating lateral sliding movement of the adjustment member relative to the base.

5. The system of claim 1, further comprising distance markings positioned in the base adjacent the adjustment member.

6. The system of claim 1, further comprising a projection connected to the adjustment member, wherein the projection aligns with distance markings in the base.

7. The system of claim 1, further comprising a set screw positioned in the adjustable depth collar includes and configured to lock the adjustable depth collar in place.

8. The system of claim 1, further comprising a set screw positioned in the adjustable depth collar includes and configured to lock the adjustable depth collar in place once the position of the adjustable depth collar is set by the adjustment member.

9. The system of claim 1, further comprising the base having a second drill adjustment groove that extends laterally with respect to the base.

10. The system of claim 1, further comprising a second guide member operatively connected to the base.

11. The system of claim 1, wherein the upright is directly connected to the base.

12. The system of claim 1, wherein the first guide member is directly connected to the upright.

13. The system of claim 1, wherein the clamp assembly is directly connected to the base.

14. A pocket hole drilling jig system, comprising:
a base;
an upright operatively connected to the base;
a clamp assembly operatively connected to the base;
a first guide member operatively connected to the base;
the first guide member having a first drill insert;
the first drill insert configured to receive and guide a drill bit having a body, a tip and an adjustable depth collar;
wherein the first drill insert extends through the first guide member at an angle such that when the drill bit is inserted in the first drill insert of the first guide member the drill bit exits a front side of the first guide member at an angle;
the base having a first drill adjustment groove that extends laterally with respect to the base;
the first drill adjustment groove having an adjustment member;
wherein the adjustment member is configured to move laterally with respect to the first drill adjustment groove and move relative to the base;
wherein the first drill adjustment groove is configured to receive the drill bit;
wherein when the drill bit is placed within the first drill adjustment groove such that the adjustable depth collar of the drill bit is received by the adjustment member, the adjustment member moves laterally thereby setting the position of the adjustable depth collar on the drill bit.

15. The system of 14, further comprising the first drill adjustment groove having an elongated section, a reduced section and a cut out portion.

16. The system of 14, further comprising the first drill adjustment groove having an elongated section, a reduced section and a cut out portion;
wherein the elongated section of the first drill adjustment groove is configured to receive the body of the drill bit;
wherein the reduced section of the first drill adjustment groove is configured to receive the tip of the drill bit;
wherein the cut out portion of the first drill adjustment groove is configured to receive the adjustable depth collar of the drill bit.

17. The system of claim 14, wherein the first drill adjustment groove is positioned in an upper surface of the base.

18. The system of claim 14, wherein the adjustment member slides laterally within the cut out portion of the first drill adjustment groove.

19. The system of claim 14, wherein the adjustment member includes a neck that is slidably received within a slot in the base thereby facilitating lateral sliding movement of the adjustment member relative to the base.

20. The system of claim 14, further comprising distance markings positioned in the base adjacent the adjustment member.

21. The system of claim 14, further comprising a projection connected to the adjustment member, wherein the projection aligns with distance markings in the base.

22. The system of claim 14, further comprising a set screw positioned in the adjustable depth collar includes and configured to lock the adjustable depth collar in place.

23. The system of claim 14, further comprising the base having a second drill adjustment groove that extends laterally with respect to the base.

24. The system of claim 14, further comprising a second guide member operatively connected to the base.

25. The system of claim 14, wherein the upright is directly connected to the base.

26. The system of claim 14, wherein the first guide member is directly connected to the upright.

27. The system of claim 14, wherein the clamp assembly is directly connected to the base.

28. A pocket hole drilling jig system, comprising:
a base;
the base having a first drill adjustment groove that extends laterally with respect to the base;
the first drill adjustment groove configured to receive a drill bit having a body, a tip and an adjustable depth collar;
the first drill adjustment groove having an adjustment member;
wherein the adjustment member is configured to move laterally with respect to the first drill adjustment groove and move relative to the base;
wherein when the drill bit is placed within the first drill adjustment groove such that the adjustable depth collar of the drill bit is received by the adjustment member, the adjustment member moves laterally thereby setting the position of the adjustable depth collar on the drill bit.

29. The system of 28, further comprising:
an upright operatively connected to the base;
a clamp assembly operatively connected to the base;
a first guide member operatively connected to the base;
the first guide member having a first drill insert.

30. The system of 28, further comprising:
a first guide member operatively connected to the base;
the first guide member having a first drill insert;
wherein the first drill insert extends through the first guide member at an angle such that when the drill bit is inserted in the first drill insert of the first guide member the drill bit exits a front side of the first guide member at an angle.

31. The system of 28, further comprising:
a first guide member operatively connected to the base;
the first guide member having a first drill insert;
the first drill insert configured to receive and guide the drill bit;
wherein the first drill insert extends through the first guide member at an angle such that when the drill bit is inserted in the first drill insert of the first guide member the drill bit exits a front side of the first guide member at an angle.

32. The system of 28, further comprising the first drill adjustment groove having an elongated section, a reduced section and a cut out portion.

33. The system of 28, further comprising:
the first drill adjustment groove having an elongated section, a reduced section and a cut out portion;

wherein the elongated section of the first drill adjustment groove is configured to receive the body of the drill bit;

wherein the reduced section of the first drill adjustment groove is configured to receive the tip of the drill bit;

wherein the cut out portion of the first drill adjustment groove is configured to receive the adjustable depth collar of the drill bit.

34. The system of claim 28, wherein the first drill adjustment groove is positioned in an upper surface of the base.

35. The system of claim 28, wherein the adjustment member slides laterally within a cut out portion of the first drill adjustment groove.

36. The system of claim 28, wherein the adjustment member includes a neck that is slidably received within a slot in the base thereby facilitating lateral sliding movement of the adjustment member relative to the base.

37. The system of claim 28, further comprising distance markings positioned in the base adjacent the adjustment member.

38. The system of claim 28, further comprising a projection connected to the adjustment member, wherein the projection aligns with distance markings in the base.

39. The system of claim 28, further comprising a set screw positioned in the adjustable depth collar includes and configured to lock the adjustable depth collar in place.

40. The system of claim 28, further comprising the base having a second drill adjustment groove that extends laterally with respect to the base.

41. The system of claim 28, further comprising a second guide member operatively connected to the base.

42. A method of setting an adjustable depth collar for use with pocket hole drilling, the steps comprising:

providing a pocket hole drilling jig having a base having a first drill adjustment groove that extends laterally with respect to the base, the first drill adjustment groove having an adjustment member;

placing a drill bit having a body, a tip and an adjustable depth collar in the first drill adjustment groove such that the adjustable depth collar is received by the adjustment member;

moving the adjustment member relative to the base to a desired position while the adjustable depth collar is received by the adjustment member;

locking the adjustable depth collar in place with a set screw once the adjustment member is moved to the desired position.

43. The method of 42, wherein the pocket hole drilling jig further comprises:

an upright operatively connected to the base;
a clamp assembly operatively connected to the base;
a first guide member operatively connected to the base;
the first guide member having a first drill insert.

44. The method of 42, wherein the pocket hole drilling jig further comprises:

a first guide member operatively connected to the base;
the first guide member having a first drill insert;
wherein the first drill insert extends through the first guide member at an angle such that when the drill bit is inserted in the first drill insert of the first guide member the drill bit exits a front side of the first guide member at an angle.

45. The method of 42, wherein the pocket hole drilling jig further comprises:

a first guide member operatively connected to the base;
the first guide member having a first drill insert;
the first drill insert configured to receive and guide the drill bit;
wherein the first drill insert extends through the first guide member at an angle such that when the drill bit is inserted in the first drill insert of the first guide member the drill bit exits a front side of the first guide member at an angle.

46. The method of 42, wherein the first drill adjustment groove having an elongated section, a reduced section and a cut out portion.

47. The method of 42, wherein the first drill adjustment groove having an elongated section, a reduced section and a cut out portion;

wherein the elongated section of the first drill adjustment groove is configured to receive the body of the drill bit;

wherein the reduced section of the first drill adjustment groove is configured to receive the tip of the drill bit;

wherein the cut out portion of the first drill adjustment groove is configured to receive the adjustable depth collar of the drill bit.

48. The method of 42, wherein the first drill adjustment groove is positioned in an upper surface of the base.

49. The method of 42, wherein the adjustment member slides laterally within a cut out portion of the first drill adjustment groove.

50. The method of 42, wherein the adjustment member includes a neck that is slidably received within a slot in the base thereby facilitating lateral sliding movement of the adjustment member relative to the base.

51. The method of 42, wherein the pocket hole drilling jig further comprises:

distance markings positioned in the base adjacent the adjustment member.

52. The method of 42, wherein the pocket hole drilling jig further comprises a projection connected to the adjustment member, wherein the projection aligns with distance markings in the base.

53. The method of 42, wherein the pocket hole drilling jig further comprises a second drill adjustment groove that extends laterally with respect to the base.

54. The method of 42, wherein the pocket hole drilling jig further comprises a second guide member operatively connected to the base.

\* \* \* \* \*